United States Patent
Caldwell

[11] 3,880,229
[45] Apr. 29, 1975

[54] HEAT EXCHANGE SYSTEM AND METHOD AND CONTROL DEVICE THEREFOR

[75] Inventor: Edward N. Caldwell, Knoxville, Tenn.

[73] Assignee: Robertshaw Controls Company, Richmond, Va.

[22] Filed: Nov. 28, 1973

[21] Appl. No.: 419,606

[52] U.S. Cl. ............ 165/40; 236/1 C; 236/35.2; 236/49
[51] Int. Cl. ............ B60h 1/00; B61d 27/00
[58] Field of Search ............ 236/49, 1 B, 1 C, 101, 236/35.2; 165/40

[56] References Cited
UNITED STATES PATENTS

| | | | |
|---|---|---|---|
| 2,306,557 | 12/1942 | Otto | 236/1 C |
| 2,537,367 | 1/1951 | Newton | 236/1 C |
| 2,805,027 | 9/1957 | Ferris | 236/35.2 |
| 3,265,300 | 8/1966 | Selway | 236/35.2 |
| 3,738,572 | 6/1973 | Hall | 236/49 |
| 3,743,180 | 7/1973 | Perkins et al. | 236/49 |

Primary Examiner—Manuel A. Antonakas
Assistant Examiner—Daniel J. O'Connor
Attorney, Agent, or Firm—Candor, Candor & Tassone

[57] ABSTRACT

A heat exchange system having a source of heat exchange output fluid for effecting a heat exchange function and having a source of return fluid resulting from said output fluid providing its heat exchange function. A thermally operated element controls the amount of flow of the output fluid from the source in relation to the temperature of the thermally operated element. A sensing device senses the temperature effect of the heat exchange function in relation to a predetermined temperature that the heat exchange system is to provide, the sensing device directing one of the output fluid and the return fluid to the thermally operated element to cause the same to change the amount of flow of the output fluid when the temperature effect deviates from the predetermined temperature a certain amount whereby the thermally responsive element is subject to a relatively wide swing in temperature for large control movement thereof in relation to a relatively narrow swing in temperature at the sensing device that causes such operation of the thermally operated element.

40 Claims, 7 Drawing Figures

HEAT EXCHANGE SYSTEM AND METHOD AND CONTROL DEVICE THEREFOR

This invention relates to a heat exchange system and method of operating the same as well as to a control unit for such system and method or the like.

It is well known that in forced air heat exchange systems for controlling the temperature in a building or the like, each system utilizes mechanically operated dampers in the forced air supply ducts and a room temperature sensing means will cause its respective damper operator to position the damper in various positions to either increase the amount of flow of duct air or decrease the amount of duct air flow in relation to a deviation in the temperature of the particular room or area being conditioned by such duct from a predetermined temperature setting of such temperature sensing means so that the temperature in the area will tend to be maintained at the selected temperature through the operation of the damper in the duct.

It is a feature of this invention to provide a thermally operated means for controlling such duct damper means, the thermally operated means opening and closing such duct damper means in relation to the temperature of the thermally operated means.

In particular, one embodiment of this invention provides a heat exchange system having a source of heat exchange output fluid for effecting a heat exchange function and having a source of return fluid resulting from the output fluid providing its heat exchange function. A thermally operated means controls the amount of flow of the output fluid from the source that is to be used for the heat exchange function in relation to the temperature of the thermally operated means. Sensing means sense the temperature effect of the heat exchange function in relation to a predetermined temperature that the heat exchange system is to provide. Means controlled by the sensing means directs one of the output fluid and the return fluid to the thermally operated means to cause the same to change the amount of flow of the output fluid when the temperature effect deviates from the predetermined temperature a certain amount whereby a relatively wide swing in the temperature of the thermally operated means can be provided even through the sensing means is sensing a relatively narrow swing in temperature from the predetermined temperature to effect the wide swing in temperature of the thermally operated means.

Accordingly, it is an object of this invention to provide a heat exchange system having one or more of the novel features set forth above or hereinafter shown or described.

Another object of this invention is to provide a method for operating aheat exchange system, the method of this invention having one or more of the novel features set forth above or hereinafter shown or described.

Another object of this invention is to provide a control device that can be utilized in such heat exchange system and method or the like, the control device of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
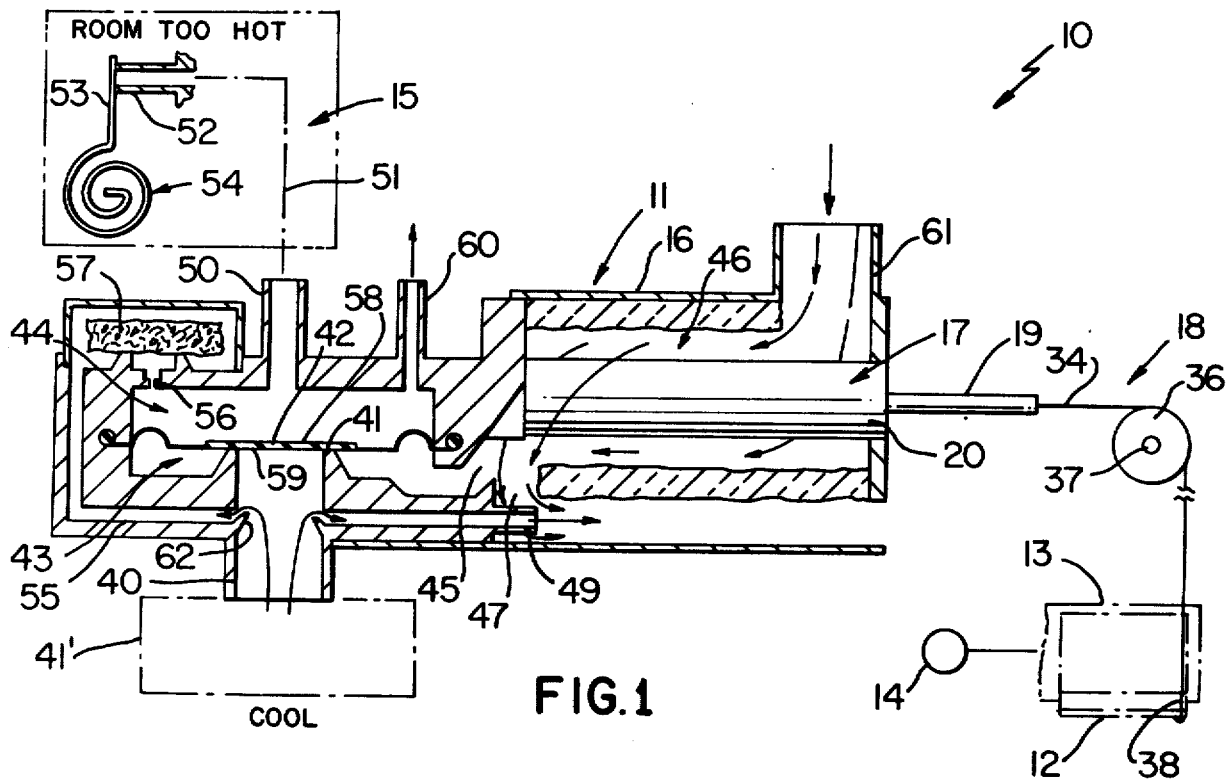
FIG. 1 is a schematic view illustrating the improved heat exchange system of this invention for a cooling operation and when the temperature in the area being conditioned thereby is too hot.

While the various features of this invention are hereinafter described and illustrated as being particularly adapted for providing a heat exchange system of the forced air type, it is to be understood that the various features of this invention can be utilized singly or in any combination thereof to provide other types of heat exchange systems as desired.

Therefore, this invention is not to be limited to only the embodiments illustrated in the drawings, because the drawings are merely utilized to illustrate one of the wide variety of uses of this invention.

Figure 2:
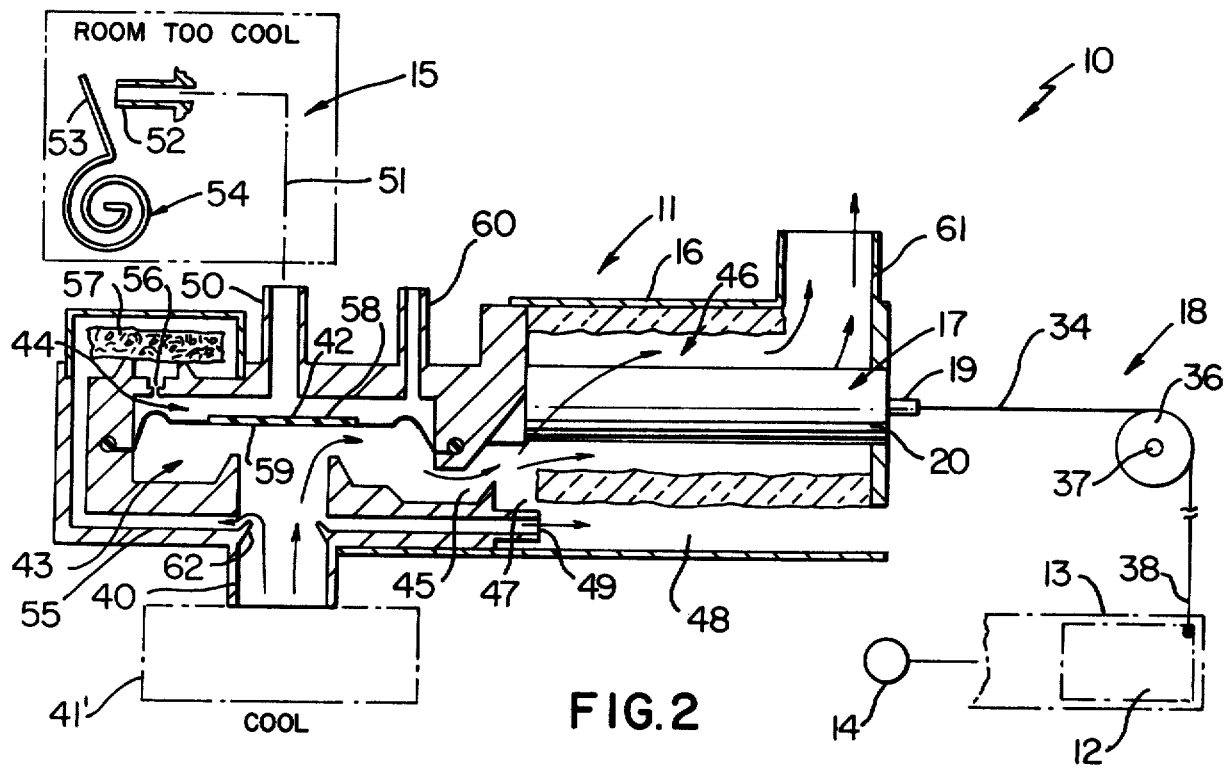
FIG. 2 is a view similar to FIG. 1 and illustrates the heat exchange system of FIG. 1 when the area being conditioned by such system is too cool.

Referring now to FIGS. 1 and 2, the improved heat exchange system of this invention is generally indicated by the reference numeral 10 and comprises a control unit of this invention that is generally indicated by the reference numeral 11 and is utilized for controlling the position of a damper 12 disposed in an air duct 13 being supplied with forced air from a conventional heat exchanger 14 and being directed by the duct 13 to an area 15 that is to be conditioned by the air from the duct 13.

The control device 11 comprises a housing means 16 containing thermally operated means 17 constructed and arranged in a manner hereinafter described to operate a pulley arrangement 18 that is interconnected to the damper 12 to cause opening of the same as illustrated in FIG. 1 when a retractible and extendible member 19 of the thermally operated means 16 is in the extended condition of FIG. 1 and to move the damper 12 to a closed position as illustrated in FIG. 2 when the member 19 is retracted in a manner hereinafter described when the heat exchange system 10 is to provide cooling for the area 15 as will be apparent hereinafter.

While the thermally operated means 17 is schematically illustrated in FIGS. 1–4 as containing a single cylinder 20 having the single piston 19 operated thereby in a manner hereinafter described, a plurality of thermally operated piston and cylinder elements can be disposed in aligned abutting relation in the manner illustrated in FIG. 7 and each being generally indicated by the reference numeral 21 and respectively having a cylinder member 22 and a piston member 23 and being charged with a wax charge 24 which is capable of exerting substantial force when the same is melted by the element 21 being heated to a certain temperature.

Figure 7:
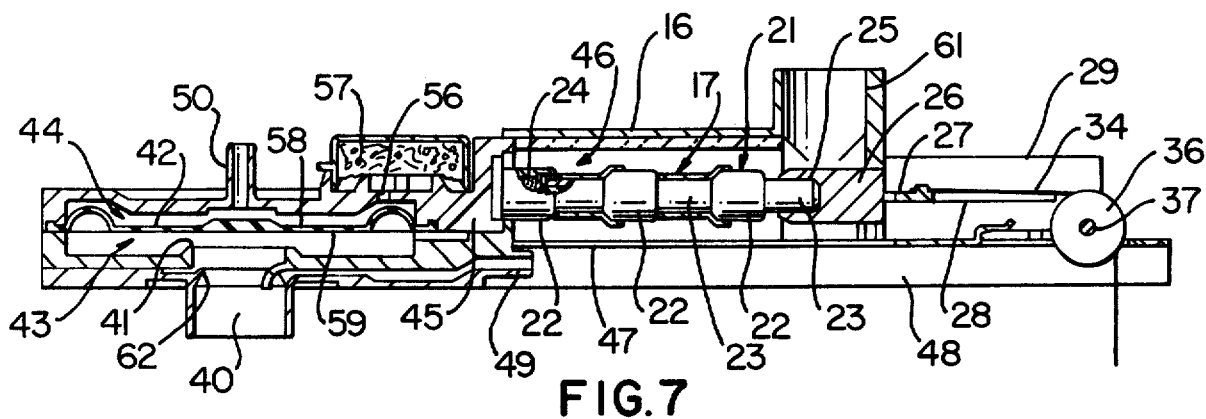
FIG. 7 is a cross sectional view taken on line 7—7 of FIG. 6 with one of the thermal elements being broken away.

The thermally operated elements 21 are illustrated in their completely retracted condition in FIG. 7 and the right-hand element 21 in FIG. 7 has its piston 23 being received in a closed bore 25 of a motion transmitting rod 26 that is operatively interconnected to slide member 27. The slide member 27 has opposed ends thereof extending respectively out of slots 28 provided in spaced and parallel side members 29 of the housing means 16 whereby the slide member 27 can be moved from left to right in the slots 28 when the pistons 23 of the elements 21 are extended by the elements 21 being heated to a certain temperature as will be apparent hereinafter.

Figure 6:
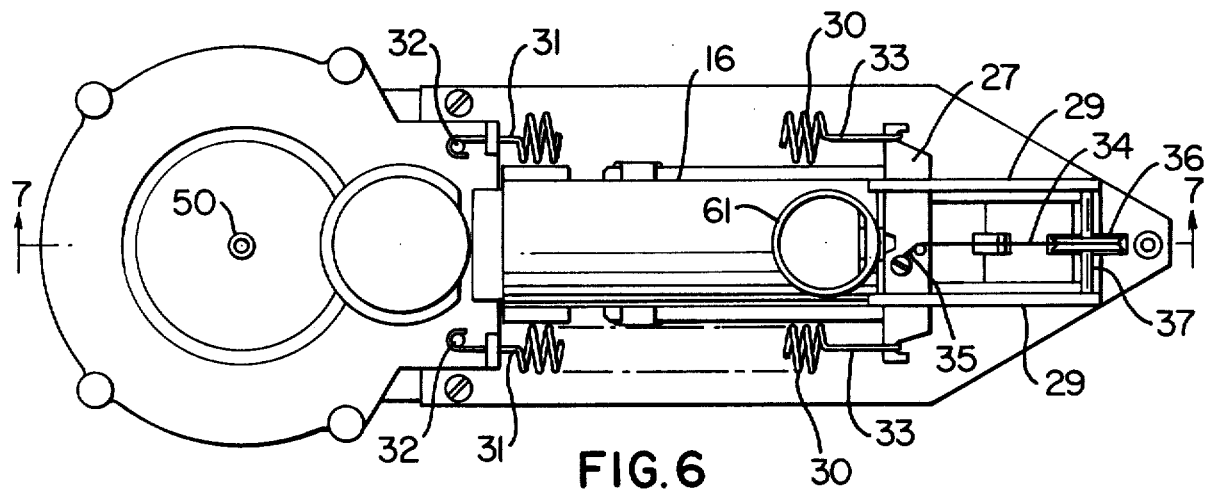
FIG. 6 is a top view of the control unit of FIG. 5.
Figure 5:
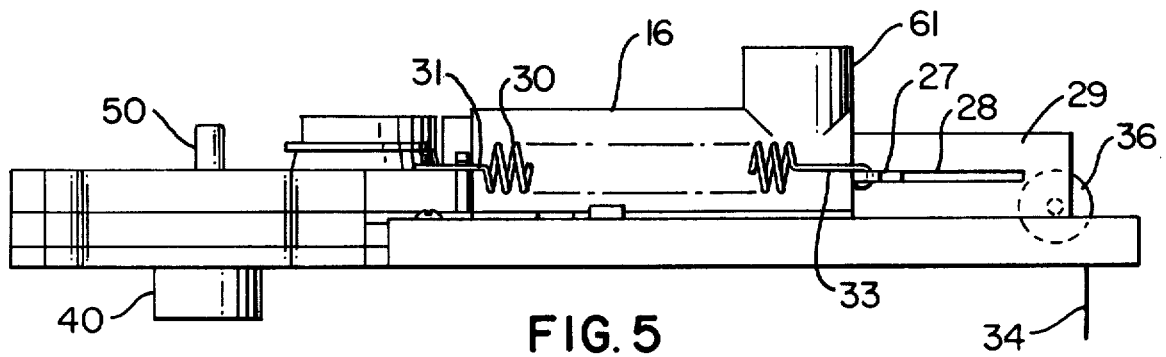
FIG. 5 is a side view of the improved control unit of this invention to be utilized in the heat exchange system of FIGS. 1 and 3.

A pair of tension springs 30, FIGS. 5 and 6, respectively have ends 31 fastened to post means 32 of the housing means 16 and the other ends 33 thereof fastened to the slide member 27 to tend to move the slide member to the left in the slots 28 and thereby assist in driving the pistons 23 of the elements 21 back to their retracted positions when the wax charges 24 therein resolidify due to the same cooling to a temperature below the melt temperature thereof.

The pulley arrangement 18 includes a cable 34 having one end 35 fastened to the slide member 27 in the medial portion thereof and passes over a pulley wheel 36 rotatably mounted between the frame sides 29 by suitable shaft means 37 so that the other end 38 of the cable 34 can be attached to the damper 12 to cause pivoting movement of the damper 12 to its closed position when the cable 34 is drawn upwardly from the position illustrated in FIG. 1 to the position illustrated in FIG. 2 by the piston means 19 being retracted and permitting the weight of the damper 12 to move the same to the open condition thereof when the cable 34 is permitted to move downwardly by the piston means 19 being moved to its extended condition as illustrated in FIG. 1.

Thus, it can be seen that the damper 12 of the duct 13 will be moved to its open position when the thermal element 17 in FIGS. 1 and 2 is heated to a certain temperature and will be moved to its closed position as illustrated in FIG. 2 when the thermal element 17 has been cooled below that certain temperature thereof.

Since the control system 10 illustrated in FIGS. 1 and 2 is to provide a cooling cycle for the area 15, the damper 12 is moved to the open position illustrated in FIG. 1 when the area 15 is too hot and is moved to its closed position illustrated in FIG. 2 when the room is too cool as will be apparent hereinafter.

As illustrated schematically in FIG. 1 and in detail in FIG. 7, the housing means 16 is provided with an inlet 40 adapted to be interconnected to duct air or fluid intermediate the heat exchange 14 and the damper 12 by interconnecting means 41' as illustrated in FIG. 1, the inlet 40 leading to a valve set 41 adapted to be opened and closed by a diaphragm valve member 42 dividing a compartment of the housing means 16 into two chambers 43 and 44. The chamber 43 is interconnected to the inlet 40 when the valve seat 41 is opened in the manner illustrated in FIGS. 2 and 7 and such chamber 43 is interconnected by a passage means 45 to a chamber 46 of the housing 16 that contains the thermally operated means 17 or 21 as illustrated in FIGS. 1 and 7.

The chamber 46 also is interconnected through suitable passage means 47 to an exhaust chamber 48 for a purpose hereinafter described, the inlet 40 also being interconnected to the exhaust chamber 48 by an aspirator nozzle means 49 for a purpose hereinafter described.

The chamber 44 of the housing 16 is interconnected to a nipple 50 which is adapted to be interconnected by a suitable conduit means 51 schematically illustrated in FIGS. 1 and 2 to a bleed nozzle port 52 adapted to be opened and closed by a bimetal temperature sensing element 53 of a suitable room thermostat which is adapted to be set in a manner well known in the art to close against the valve port 52 when the temperature in the room reaches the selected temperature and to open away from the nozzle portion 52 when the temperature in the room falls below the preselected temperature for a purpose hereinafter described.

The chamber 44 of the diaphragm valve 42 is also interconnected to the inlet 40 by a passage means 55 that has a restrictor 56 and filter means 57 therein so that duct air is adapted to also bleed into the chamber 44 and act against the upper side 58 of the diaphragm valve member 42 to urge the same to tis closed position when the nozzle port 52 is closed by the bimetal member 53 in the manner illustrated in FIG. 1. However, when the bimetal member 53 moves away from the nozzle 52, fluid pressure in the chamber 44 is dumped into the room or otherwise exahusted whereby the force of the fluid pressure acting against the underside 59 of the valve member 42 moves the same to the open condition as illustrated in FIG. 2 for a purpose hereinafter described.

If desired, another nipple 60 can be interconnected to the chamber 44 to be interconnected to slave units but for the purpose of understanding this invention in the simple form illustrated in FIGS. 1–4, it should be assumed that the nipple 60 is closed off so that the opening and closing of the port 52 by the bimetal member 53 will cause the valve member 42 to respectively assume an opened position relative to the valve seat 41 or a closed position against the valve seat 41 for a purpose hereinafter described.

The chamber 46 of the control unit 11 has an inlet 61 adapted to be interconnected to return air means for the room or area 15 and heat exchanger 14 in any suitable manner.

The operation of the heat exchange system 10 of FIGS. 1 and 2 will now be described.

When the system 10 is to be utilized for a cooling heat exchange arrangement as illustrated in FIGS. 1 and 2, the thermal elements 17 and 21 can be charged with wax that has a melt range between the highest duct temperature and the lowest set point temperature for the system 10 and such range is preferably midway between such temperatures. For example, with a duct temperature of 50°F to 60°F and a set point range for the thermostat 54 of 75°F to 85°F, the melt range for the wax charges 24 of 63°F to 67°F could be chosen. Similarly, in a heating application as provided in FIGS. 3 and 4, the melt range for the charges 24 of the elements 21 would be chosen to have a melt range between the highest set point temperature of the thermostat 54 and the lowest duct temperature.

Assuming that the operator has set the thermostat 54 to tend to maintain the room or area 15 at 75°F, should the temperature in room 15 be above 75°F, such as 75.5°F and above, the bimetal member 53 of the thermostat 54 closes off the nozzle port 52 in the manner illustrated in FIG. 1 so that pressure can build up in the chamber 44 through the restrictor 56 as the duct 13 will supply forced air under pressure through the inlet 40 of the control device 11 as previously described. When such pressure in the chamber 44 reaches a certain value, the same causes the valve member 42 to close against the valve seat 41 whereby all of the air now entering the inlet 40 passes through the aspirator 49 as illustrated in FIG. 1 into the exhaust chamber 48 and through the well known principle of the operation of aspirators, such aspirator 49 draws return or room air into the inlet 61 so that such return air is drawn across the thermally operated means 17 or 21. Since the return air from the room 15 is approximately 72°F to 90°F, the return air will heat the wax charges 24 of the elements 21 and causes the same to melt and thereby extend the piston means 19 or 23 to the right in the drawings and thereby permit the cable 34 to move the damper 12 to the fully opened position thereof as illustrated in FIG. 1. In this manner, the entire air flow through the duct 13 can be supplied to the area 15 to cool the same and thereby bring the temperature of the area 15 down to the set temperature of 75°F.

However, should the area 15 become too cool, for example, be at a temperature of 74.5°F or lower, the bimetal member 53 moves away from the nozzle port 52 and thereby bleeds the pressure from the chamber 44 to the atmosphere so that the pressure fluid in the inlet 40 moves the valve member 42 away from the valve seat 41 whereby the majority of the air entering the inlet 40 passes through the now opened valve seat 41, chamber 43 and passage 45 into the chamber 46 and out through the passage 61 as duct air has a greater pressure that the pressure of the return air. In this manner, since the duct air is at a temperature of 50°F–60°F and flows over the thermal elements 17 or 21, such temperature causes the wax charges 24 thereof to resolidify whereby the piston means 19 or 24 are retracted from right to left and the springs 30 pull the slide member 27 and cable 34 to the position illustrated in FIGS. 2 and 7 whereby the damper 12 is moved to its closed positioned thereby cutting off cool air from the area 15 so that the same can begin to warm up to the set temperature of 75°F.

When the valve member 42 is moved away from the valve seat 41, it is desired that most of the fluid from the inlet 40 pass to the chamber 46 without going through the aspirator 49. Thus, an annular and angled flange 62 can be provided for the inlet 40 to tend to reduce the flow through the aspirator 49 when the valve member 42 is in the open position as illustrated in FIGS. 2, 4 and 7.

Therefore, it can be seen that by cycling the damper 12 between its open and closed positions, or partially open and partially closed positions thereof as the case may be, the control device 11 will tend to maintain the area 15 at the temperature setting of the thermostat 54 and this is accomplished by providing a large swing in temperature of the thermally operated means 17 and/or 21 by utilizing either duct fluid or return fluid even though only a narrow swing in temperature differential is being provided in the area 15 to cause the bimetal member 53 to open and close against the port 52.

Figure 3:
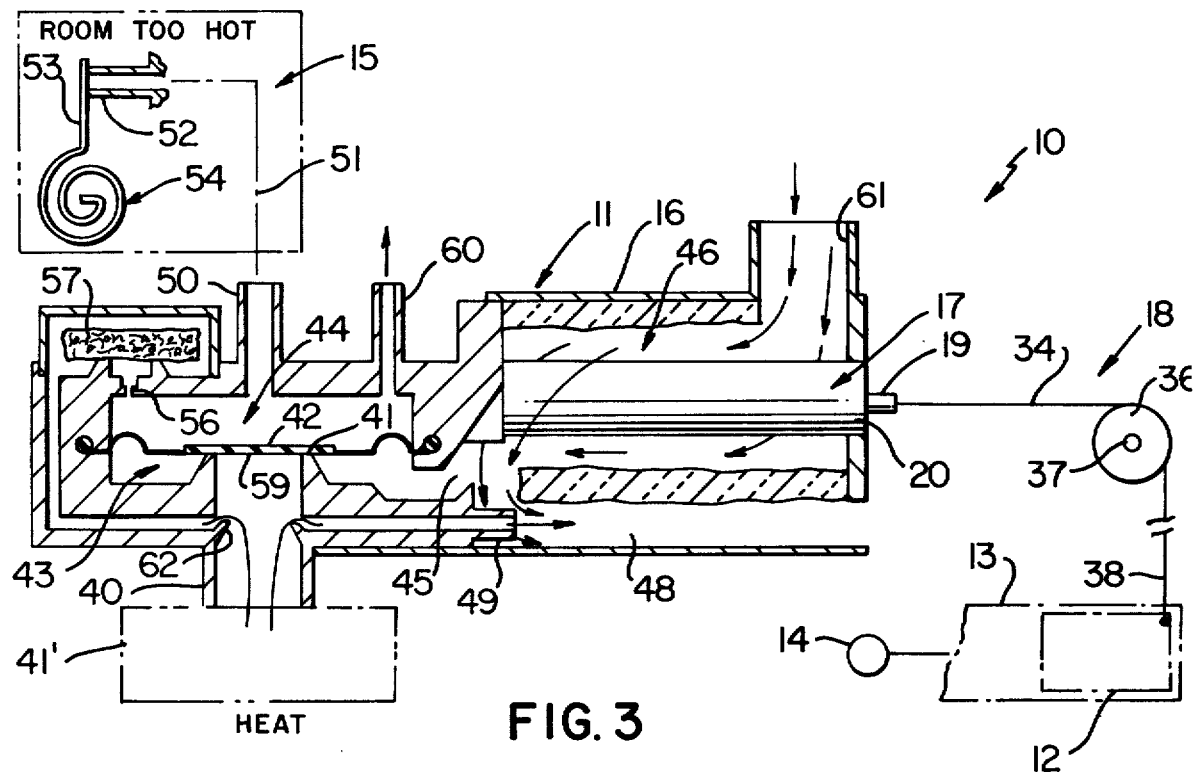
FIG. 3 is a view similar to FIG. 1 and illustrates the heat exchange system of this invention for heating the area to be conditioned thereby and when the area is too hot.
Figure 4:
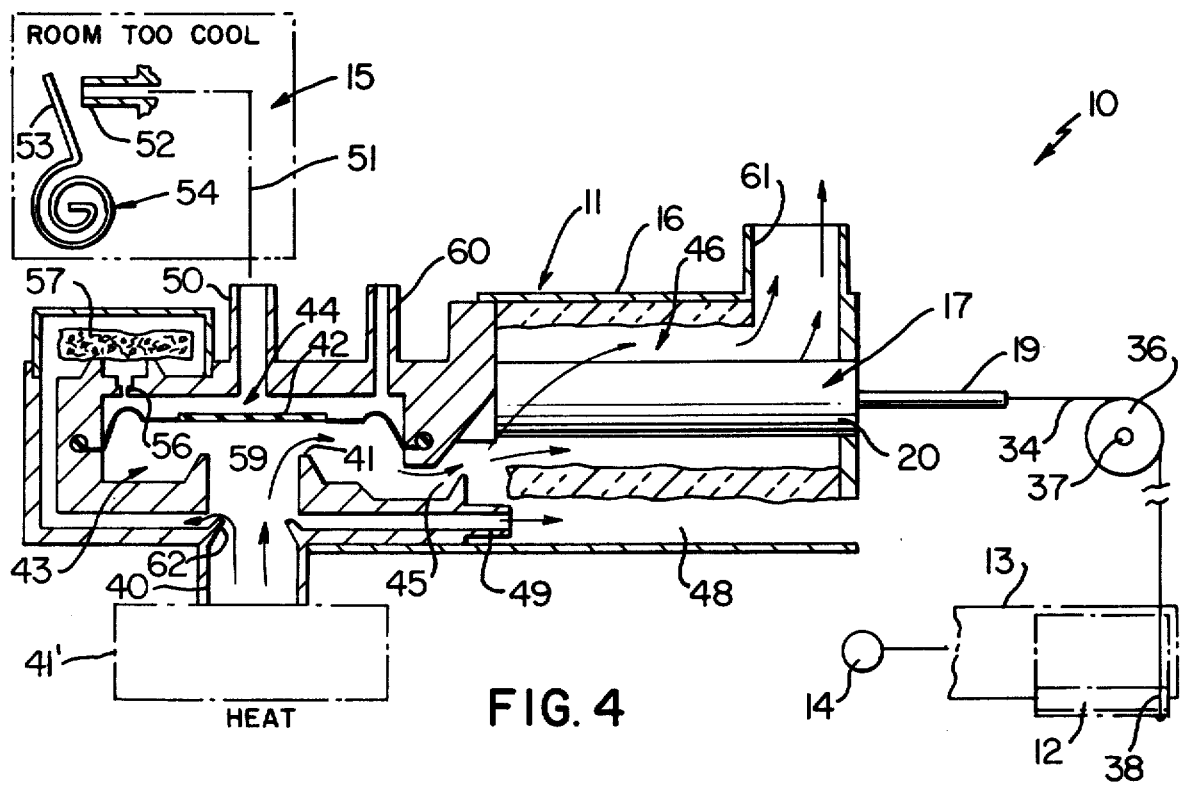
FIG. 4 is a view similar to FIG. 3 and illustrates the heat exchange system of FIG. 3 when the area being conditioned thereby is too cool.

Referring now to FIGS. 3 and 4, the control system 10 is now being utilized to provide a heating operation for the area 15 and, as previously stated, the thermally operated means 17 has been charged with wax to have a melt range between the highest set point temperature of the thermostat 54 and the lowest duct temperature of the heated air being supplied by the heat exchanger 14 into the duct 13 whereby the same reference numerals of FIGS. 1 and 2 are utilized for like parts for the system 10 of FIGS. 3 and 4.

Assuming that the operator has set the thermostat 54 to tend to maintain the temperature in the room or area 15 at 75°F and the temperature in such room is 75.5°F or above, the bimetal members 53 closes off the port 52 to thereby cause the valve member 24 'ɔ close against the valve seat 41 in the manner previously described. Such closing of the valve seat 42 causes the duct fluid in the inlet 40 to pass through the aspirator 49 and thereby draws return air into the chamber 46 and over the thermally responsive operated means 17 to cause the same to cool and thereby retract its piston means 19 and move the damper 12 to its closed position. Thus, heated air will no longer be supplied to the room 15 until the temperature thereof falls below the set temperature of 75°F.

As illustrated in FIG. 4, should the temperature of the room fall below the set temperature of 75°F, such as to 74.5°F and lower, the bimetal member 53 of the thermostat 54 moves away from the port 52 to dump the fluid pressure in the chamber 44 and thereby permit the valve member 42 t ͠ move to its open position as illustrated in FIG. 4 and d heated duct air into the chamber 46 and thereby heat the thermally operated means 17 so that the same extends its piston means 19 to thereby open the damper 12 and supply heated air into the area 15 so that the same will heat up to the selected temperature.

Thus, it can be seen that the system 10 of FIGS. 3 and 4 also provides a wide swing in the temperature of the thermally operated means 17 with only a narrow swing of temperature at the thermostat 54 as previously described.

Therefore, it can be seen that this invention not only provides an improved heat exchange system and method of operating the same, but also this invention provides an improved control device for such system and method or the like.

While the control system of this invention has been illustrated and described as being of the floating type with the thermally operated means always moving in one direction or the other, the control device 11 of this invention could take a form of a blending or mixing valve to cause the thermally operated means to be exposed to air or fluid at the temperature proportional to the deviation from the set point as sensed by the room thermostat so as to give proportional control. Also, while the system has been described for use with a wax charged thermally operated element, it is ⨰ be understood that this invention is not limited to such use as the thermally operated means can be utilized with any thermal-mechanical transducer to effect improved sensitivity or speed of response in the control of the damper 12 or other desired structure.

In addition, the principle of operation of this invention is not limited to the use of forced air systems as the same can also be applied to advantage for other mediums of heat transfer.

Therefore, while the form and method of this invention now preferred have been described and illustrated as required by the Patent Statute, it is to be understood that other forms and methods can be utilized and still come within the scope of the appended claims.

What is claimed is:

1. A heat exchange system comprising a zone to be treated a source of heat exchange output fluid for effecting a heat exchange function in said zone, a source of return fluid resulting from said output fluid providing its heat exchange function in said zone, thermally operated means for controlling the amount of flow of said output fluid from said source that is to be utilized for said heat exchange function in said zone in relation to the temperature of said thermally operated means, sensing means for sensing the temperature effect of said heat exchange function in said zone in relation to a predetermined temperature that said heat exchange system is to provide in said zone, and means controlled by said sensing means for directing one of said output fluid and said return fluid to said thermally operated means to cause the same to change the amount of flow of said output fluid when said temperature effect in said zone deviates from said predetermined temperature a certain amount.

2. A heat exchange system as set forth in claim 1 wherein said output fluid is a cooling fluid.

3. A heat exchange system as set forth in claim 1 wherein said output fluid is a heating fluid.

4. A heat exchange system as set forth in claim 1 wherein said thermally operated means comprises a wax charged piston and cylinder thermal element.

5. A heat exchange system as set forth in claim 1 wherein said thermally operated means comprises a plurality of wax charged piston and cylinder thermal elements disposed in abutting aligned relation.

6. A heat exchange system as set forth in claim 1 and including a duct means for directing said output fluid from said source to said zone to have said heat exchange function take place in said zone, said duct means having damper means for controlling the flow of fluid therethrough, said thermally operated means being operatively interconnected to said damper means to control the position of said damper means and, thus, the amount of flow of output fluid through said duct means.

7. A heat exchange system as set forth in claim 6 wherein said thermally operated means comprises an extendible and retractible member, pulley means operatively interconnecting said extendible and retractible member to said damper means to operatively interconnect said thermally operated means thereto.

8. A heat exchange system comprising a source of heat exchange output fluid for effecting a heat exchange function, a source of return fluid resulting from said output fluid providing its heat exchange function, thermally operated means for controlling the amount of flow of said output fluid from said source that is to be utilized for said heat exchange function in relation to the temperature of said thermally operated means, sensing means for sensing the temperature effect of said heat exchange function in relation to a predetermined temperature that said heat exchange system is to provide, means controlled by said sensing means for directing one of said output fluid and said return fluid to said thermally operated means to cause the same to change the amount of flow of said output fluid when said temperature effect deviates from said predetermined temperature a certain amount, a duct means for directing said ouput fluid from said source to a desired area to have said heat exchange function take place, said duct means having damper means for controlling the flow of fluid therethrough, said thermally operated means being operatively interconnected to said damper means to control the position of said damper means and, thus, the amount of flow of output fluid through said duct means, said thermally operated means comprising an extendible and retractible member, pulley means operatively interconnecting said extendible and retractible member to said damper means to operatively interconnect said thermally operated means thereto, and spring means interconnected to said pulley means to tend to pull said pulley means in one direction, said pulley means having a slide member interconnected to said spring means, said extendible and retractible member abutting said slide member and moving said slide member in a direction opposite to said one direction in opposite to the force of said spring means when said member is extended.

9. A heat exchange system comprising a source of heat exchange output fluid for effecting a heat exchange function, a source of return fluid resulting from said output fluid providing its heat exchange function, thermally operated means for controlling the amount of flow of said output fluid from said source that is to be utilized for said heat exchange function in relation to the temperature of said thermally operated means, sensing means for sensing the temperature effect of said heat exchange function in relation to a predetermined temperature that said heat exchange system is to provide, and means controlled by said sensing means for directing one of said output fluid and said return fluid to said thermally operated means to cause the same to change the amount of flow of said output fluid when said temperature effect deviates from said predetermined temperature a certain amount, said means controlled by said sensing means comprising a fluid operated valve means for directing said output fluid to said thermally operated means when said sensing means moves said valve means to one of its operating positions.

10. A heat exchange system as set forth in claim 9 wherein said means controlled by said sensing means comprises an aspirator for drawing said return fluid to said thermally operated device when said aspirator has fluid directed therethrough, said valve means causing output fluid to be directed through said aspirator when said sensing means moves said valve means to another operating position thereof.

11. A heat exchange system comprising a zone to be treated a source of heat exchange output fluid for effecting a heat exchange function in said zone, thermally operated means for controlling the amount of flow of said output fluid from said source that is to be utilized for said heat exchange function in said zone in relation to the temperature of said thermally operated means, sensing means for sensing the temperature effect of said heat exchange function in said zone in relation to a predetermined temperature that said heat exchange system is to provide in said zone, and means controlled by said sensing means for directing one of a cooling fluid and a heating fluid to said thermally operated means to cause the same to change the amount of flow of said output fluid when said temperature effect deviates from said predetermined temperature a certain amount whereby a wide temperature swing can be provided for said thermally responsive device with only a narrow temperature swing of said temperature effect in said zone.

12. A heat exchange system as set forth in claim 11 wherein said output fluid is a cooling fluid.

13. A heat exchange system as set forth in claim 11 wherein said output fluid is a heating fluid.

14. A heat exchange system as set forth in claim 11 wherein said thermally operated means comprises a wax charged piston and cylinder thermal element.

15. A heat exchange system as set forth in claim 11 wherein said thermally operated means comprises a plurality of wax charged piston and cylinder thermal elements disposed in abutting aligned relation.

16. A control unit for a heat exchange system or the like comprising a housing means having means adapted for receiving heat exchange output fluid from a source thereof that is to be utilized for effecting a heat exchange function in a zone and for receiving return fluid resulting from said output fluid providing its heat exchange function in said zone, thermally operated means carried by said housing means adapted to control the amount of flow of said output fluid from said source that is to be utilized for said heat exchange function in said zone in relation to the temperature of said thermally operated means, and means adapted to be controlled by a zone temperature sensing means for directing one of said output fluid and said return fluid to said thermally operated means to cause the same to be adapted to change the amount of flow of said output fluid when the temperature effect of said heat exchange function in said zone deviates from a predetermined temperature a certain amount.

17. A control unit as set forth in claim 16 wherein said thermally operated means comprises a wax charged piston and cylinder thermal element.

18. A control unit as set forth in claim 16 wherein said thermally operated means comprises a plurality of wax charged piston and cylinder thermal elements disposed in abutting aligned relation.

19. A control unit as set forth in claim 16 wherein said thermally operated means comprises an extendible and retractible member, pulley means carried by said housing means and being operatively interconnected to said extendible and retractible member and being adapted to be interconnected to a damper means that controls the flow of said output fluid.

20. A control unit for a heat exchange system or the like comprising a housing means having means adapted for receiving heat exchange ouput fluid from a source thereof that is to be utilized for effecting a heat exchange function and for receiving return fluid resulting from said output fluid providing its heat exchange function, thermally operated means carried by said housing means adapted to control the amount of flow of said output fluid from said source that is to be utilized for said heat exchange function in relation to the temperature of said thermally operated means, means adapted to be controlled by a sensing means for directing one of said output fluid and said return fluid to said thermally operated means to cause the same to be adapted to change the amount of flow of said output fluid when the temperature effect of said heat exchange function deviates from a predetermined temperature a certain amount, said thermally operated means comprising an extendible and retractible member, pulley means carried by said housing means and being operatively interconnected to said extendible and retractible member and being adapted to be interconnected to a damper means that controls the flow of said output fluid, and spring means carried by said housing member and being interconnected to said pulley means to tend to pull said pulley means in one direction, said pulley means having a slide member interconnected to said spring means, said extendible and retractible member abutting said slide member and moving said slide member in a direction opposite to said one direction in opposition to the force of said spring means when said member is extended.

21. A control unit for a heat exchange system or the like comprising a housing means having means adapted for receiving heat exchange output fluid from a source thereof that is to be utilized for effecting a heat exchange function and for receiving return fluid resulting from said output fluid providing its heat exchange function, thermally operated means carried by said housing means adapted to control the amount of flow of said output fluid from said source that is to be utilized for said heat exchange function in relation to the temperature of said thermally operated means, and means adapted to be controlled by a sensing means for directing one of said output fluid and said return fluid to said thermally operated means to cause the same to be adapted to change the amount of flow of said output fluid when the temperature effect of said heat exchange function deviates from a predetermined temperature a certain amount, said means adapted to be controlled by said sensing means comprising a fluid operated valve means adapted to direct said output fluid to said thermally operated means when said sensing means moves said valve means to one of its operating positions.

22. A control until as set forth in claim 21 wherein said means adapted to be controlled by said sensing means comprises an aspirator adapted to draw said return fluid to said thermally operated device when said aspirator has fluid directed therethrough, said valve means being adapted to cause output fluid to be directed through said aspirator when said sensing means moves said valve means to another operating position thereof.

23. A control unit for a heat exchange system or the like comprising a housing means having means adapted to receive a source of cooling fluid and a source of heating fluid, thermally operated means carried by said housing means and adapted to control the amount of flow of heat exchange output fluid from a source thereof that is to be utilized for a heat exchange function in a zone in relation to the temperature of said thermally operated means, and means adapted to be controlled by a zone temperature sensing means for directing one of said cooling fluid and said heating fluid to said thermally operated means to cause the same to be adapted to change the amount of flow of said output fluid when the temperature effect in said zone deviates from a predetermined temperature a certain amount whereby a wide temperature swing can be provided for said thermally responsive device with only a narrow temperature swing of said temperature effect in said zone.

24. A control unit as set forth in claim 23 wherein said thermally operated means comprises a wax charged piston and cylinder thermal element.

25. A control unit as set forth in claim 23 wherein said thermally operated means comprises a plurality of wax charged piston and cylinder thermal elements disposed in abutting aligned relation.

26. A method for operating a heat exchange system for a zone comprising the steps of providing a source of heat exchange output fluid for effecting a heat exchange function in said zone, providing a source of return fluid resulting from said output fluid providing its heat exchange function in said zone, controlling the amount of flow of said output fluid from said source that is to be utilized for said heat exchange function in said zone by a thermally operated means in relation to the temperature of said thermally operated means, sensing the temperature effect of said heat exchange function in said zone with a sensing means in relation to a predetermined temperature that said heat exchange system is to provide in said zone, and directing one of said output fluid and said return fluid to said thermally operated means by means under the control under the control of said sensing means to cause the same to change the amount of flow of said output fluid when said temperature effect in said zone deviates from said predetermined temperature a certain amount.

27. A method as set forth in claim 26 wherein said output fluid is a cooling fluid.

28. A method as set forth in claim 26 wherein said output fluid is a heating fluid.

29. A method as set forth in claim 26 and including the step of forming said thermally operated means from a wax charged piston and cylinder thermal element.

30. A method as set forth in claim 26 and including the step of forming said thermally operated means from a plurality of wax charged piston and cylinder thermal elements disposed in abutting aligned relation.

31. A method as set forth in claim 26 and including the step of providing a duct means for directng said output fluid from said source to said zone to have said heat exchange function take place in said zone, said duct means having damper means for controlling the flow of fluid therethrough, and operatively interconnecting said thermally operated means to control the position of said damper means and, thus, the amount of flow of output fluid through said duct means.

32. A method as set forth in claim 31 and including the steps of forming said thermally operated means from an extendible and retractible member, and operatively interconnecting a pulley means to said extendible and retractible member and to said damper means to operatively interconnect said thermally operated means thereto.

33. A method for operating a heat exchange system comprising the steps of providing a source of heat exchange output fluid for effecting a heat exchange function, providing a source of return fluid resulting from said output fluid providing its heat exchange function, controlling the amount of flow of said output fluid from said source that is to be utilized for said heat exchange function by a thermally operated means in relation to the temperature of said thermally operated means, sensing the temperature effect of said heat exchange function with a sensing means in relation to a predetermined temperature that said heat exchange system is to provide, directing one of said output fluid and said return fluid to said thermally operated means by means under the control of said sensing means to cause the same to change the amount of flow of said output fluid when said temperature effect deviates from said predetermined temperature a certain amount, providing a duct means for directing said output fluid from said source to a desired area to have said heat exchange function take place, said duct means having damper means for controlling the flow of fluid therethrough, operatively interconnecting said thermally operated means to said damper mens to control the position of said damper means and, thus, the amount of flow of output fluid through said duct means, forming said thermally operated means from an extendible and retractible member, operatively interconnecting a pulley means to said extendible and retractible member and to said damper means to operatively interconnect said thermally operated means thereto, interconnecting spring means to said pulley means to tend to pull said pulley means in one direction, and abutting said extendible and retractible member against said slide member to move said slide member in a direction opposite to said one direction in opposition to the force of said spring means when said member is extended.

34. A method for operating a heat exchange system comprising the steps of providing a source of heat exchange output fluid for effecting a heat exchange function, providing a soruce of return fluid resulting from said output fluid providing its heat exchange function, controlling the amount of flow of said output fluid from said source that is to be utilized for said heat exchange function by a thermally operated means in relation to the temperature of said thermally operated means, sensing the temperature effect of said heat exchange function with a sensing means in relation to a predetermined temperature that said heat exchange system is to provide, and directing one of said output fluid and said return fluid to said thermally operated means by means under the control of said sensing means to cause the same to change the amount of flow of said output fluid when said temperature effect deviates from said predetermined temperature a certain amount, and forming said means controlled by said sensing means from a fluid operated valve means that directs said output fluid to said thermally operated means when said sensing means moves said valve means to one of its operating positions.

35. A method as set forth in claim 34 and including the steps of forming said means controlled by said sensing means from an aspirator that draws said return fluid to said thermally operated device when said aspirator has fluid directed therethrough, and causing said valve means to direct said output fluid through said aspirator when said sensing means moves said valve means to another operating position thereof.

36. A method for operating a heat exchanger system for a zone comprising the steps of providing a source of heat exchange output fluid for effectng a heat exchange function in said zone, controlling the amount of flow of said output fluid from said source that is to be utilized for said heat exchange function in said zone by thermally operated means in relation to the temperature of said thermally operated means, sensing the temperature effect of said heat exchange function in said zone with a sensing means in relation to a predetermined temperature that said heat exchange system is to provide in said zone, and directing one of a cooling fluid and a heating fluid to said thermally operated means by means under the control of said sensing means to cause the same to change the amount of flow of said output fluid when said temperature effect in said zone deviates from said predetermined temperature a certain amount whereby a wide temperature swing can be provided for said thermally responsive device with only a narrow temperature swing of said temperature effect in said zone.

37. A method as set forth in claim 36 wherein said output fluid is a cooling fluid.

38. A method as set forth in claim 36 wherein said output fluid is heating fluid.

39. A method as set forth in claim 36 and including the step of forming said thermally operated means from a wax charged piston and cylinder thermal element.

40. A method as set forth in claim 36 and including the step of forming said thermally operated means from a plurality of wax charged piston and cylinder thermal elements disposed in abutting aligned relation.

* * * * *